US009459963B2

(12) United States Patent
McKenney et al.

(10) Patent No.: US 9,459,963 B2
(45) Date of Patent: Oct. 4, 2016

(54) SAFELY ROLLING BACK TRANSACTIONS IN A TRANSACTIONAL MEMORY SYSTEM WITH CONCURRENT READERS

(75) Inventors: Paul E. McKenney, Beaverton, OR (US); Joshua A. Triplett, Hillsboro, OR (US)

(73) Assignee: International Business Machines Corporation, Armonk, NY (US)

(*) Notice: Subject to any disclaimer, the term of this patent is extended or adjusted under 35 U.S.C. 154(b) by 778 days.

(21) Appl. No.: 12/553,160

(22) Filed: Sep. 3, 2009

(65) Prior Publication Data

US 2011/0055630 A1 Mar. 3, 2011

(51) Int. Cl.
*G06F 17/30* (2006.01)
*G06F 11/14* (2006.01)
*G06F 9/46* (2006.01)
*G06F 9/52* (2006.01)

(52) U.S. Cl.
CPC ............ *G06F 11/141* (2013.01); *G06F 9/467* (2013.01); *G06F 9/52* (2013.01); *G06F 17/30218* (2013.01); *G06F 11/1482* (2013.01)

(58) Field of Classification Search
CPC ................... G06F 17/30542; G06F 17/30091; G06F 17/30233; G06F 17/30138; G06F 17/30218; G06F 17/30238; G06F 17/30303
USPC .......................................... 707/813; 711/159
See application file for complete search history.

(56) References Cited

U.S. PATENT DOCUMENTS

| 5,442,758 | A  | 8/1995  | Slingwine et al. |
|-----------|-----|---------|------------------|
| 5,608,893 | A  | 3/1997  | Slingwine et al. |
| 5,727,209 | A  | 3/1998  | Slingwine et al. |
| 6,219,690 | B1 | 4/2001  | Slingwine et al. |
| 6,886,162 | B1 | 4/2005  | McKenney         |
| 6,996,812 | B2 | 2/2006  | McKenney         |
| 7,287,135 | B2 | 10/2007 | McKenney et al.  |
| 7,353,346 | B2 | 4/2008  | McKenney et al.  |
| 2005/0149634 | A1 | 7/2005 | McKenney        |
| 2005/0198030 | A1 | 9/2005 | McKenney        |
| 2006/0100996 | A1 | 5/2006 | McKenney        |
| 2006/0112121 | A1 | 5/2006 | McKenney et al. |
| 2006/0117072 | A1 | 6/2006 | McKenney        |

(Continued)

FOREIGN PATENT DOCUMENTS

EP           0442715           10/1997

OTHER PUBLICATIONS

Grossman, Dan. "The transactional memory/garbage collection analogy." ACM SIGPLAN Notices. vol. 42. No. 10. ACM, 2007.*

(Continued)

*Primary Examiner* — Nan Hutton
(74) *Attorney, Agent, or Firm* — Walter W. Duft (57) ABSTRACT

A technique for safely rolling back transactional memory transactions without impacting concurrent readers of the uncommitted transaction data. An updater uses a transactional memory technique to perform an data update on data that is shared with a reader. The update is implemented as a transaction in which the updated data is initially uncommitted due to the transaction being subject to roll back. The reader is allowed to perform a data read on the uncommitted data during the transaction. Upon a rollback of the transaction, reclamation of memory locations used by the uncommitted data is deferred until a grace period has elapsed after which the reader can no longer be referencing the uncommitted data.

20 Claims, 5 Drawing Sheets

(56) References Cited

U.S. PATENT DOCUMENTS

| | | |
|---|---|---|
| 2006/0123100 A1 | 6/2006 | McKenney |
| 2006/0130061 A1 | 6/2006 | McKenney |
| 2006/0265373 A1 | 11/2006 | McKenney et al. |
| 2006/0282456 A1* | 12/2006 | Kapoor ............ G06F 17/30542 |
| 2007/0083565 A1 | 4/2007 | McKenney |
| 2007/0101071 A1 | 5/2007 | McKenney |
| 2007/0198520 A1 | 8/2007 | McKenney et al. |
| 2007/0226440 A1 | 9/2007 | McKenney et al. |
| 2007/0260608 A1* | 11/2007 | Hertzberg et al. .............. 707/10 |
| 2007/0266209 A1* | 11/2007 | McKenney et al. .......... 711/154 |
| 2007/0288708 A1* | 12/2007 | Saha ................... G06F 9/30032 711/159 |
| 2008/0033952 A1 | 2/2008 | McKenney et al. |
| 2008/0040720 A1 | 2/2008 | McKenney et al. |
| 2008/0082532 A1 | 4/2008 | McKenney |
| 2008/0140951 A1 | 6/2008 | McKenney et al. |
| 2008/0177742 A1 | 7/2008 | McKenney et al. |
| 2008/0215784 A1 | 9/2008 | McKenney |
| 2008/0229309 A1 | 9/2008 | McKenney |
| 2008/0288749 A1 | 11/2008 | McKenney et al. |
| 2008/0313238 A1 | 12/2008 | McKenney et al. |
| 2008/0320262 A1 | 12/2008 | McKenney et al. |
| 2009/0006403 A1 | 1/2009 | McKenney |
| 2009/0077080 A1 | 3/2009 | McKenney |

OTHER PUBLICATIONS

Saha, Bratin, et al. "McRT-STM: a high performance software transactional memory system for a multi-core runtime." Proceedings of the eleventh ACM SIGPLAN symposium on Principles and practice of parallel programming. ACM, 2006.*

J. Seigh, "RCU + SMR for preemptive kernel/user threads," Linux Kernel Mailing List, May 9, 2005, 2 pages.

M. Michael, "Hazard Pointers: Safe Memory Reclamation for Lock-Free Objects," IEEE Transactions on Parallel and Distributed Systems, Jun. 2004, vol. 15, No. 6, pp. 491-504.

D. Sarma et al., "Making RCU Safe for Deep Sub-Millisecond Response Realtime Applications," 2004 USENIX (UseLinux track) Jun. 2004, 9 pages.

P. McKenney, "RCU vs. Locking Performance on Different CPUs," 2004 Linux.conf.au, 2004, 18 pages.

P. McKenney et al., "Scaling dcache with RCU," Linux Journal, Jan. 1, 2004, 12 pages.

P. McKenney et al., "Using RCU in the Linux 2.5 Kernel," Linux Journal, Oct. 1, 2013, 11 pages.

P. McKenney et al.,"Read-Copy Update," 2002 Ottawa Linux Symposium, Jul. 8, 2002, 28 pages.

H. Linder et al., "Scalability of the Directory Entry Cache," 2002 Ottawa Linux Symposium, Jun. 26, 2002, pp. 289-300.

P. Mckenney et al., "Read-Copy Update," 2001 Ottawa Linux symposium, Jul. 2001, 22 pages.

P. McKenney et al., "Read-Copy Update: Using Execution History to Solve Concurrency Problems," PDCS, Oct. 1998, 11 pages.

S. Dietrich et al., "Evolution of Real-Time Linux," 7th RTL Workshop, Nov. 17, 2005, 18 pages.

B. Gamsa, "Tornado: Maximizing Locality and Concurrency in a Shared Memory Multiprocessor Operating System," 1999, 14 pages.

Molnar et al., "Realtime and Linux," 2005 Linux Kernel Summit, 8 pages.

H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.

M. Michael, "Scalable Lock-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.

D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.

J. Corbet, "Read-copy-update for realtime," LWN.net, Sep. 26, 2006, 3 pages.

"Priority Inversion," Wikipedia, Feb. 4, 2007, 3 pages.

McKenney, "Seven real-time Linux approaches (Part C)", LinuxDevices.com, Jun. 7, 2005, 13 pages.

P. McKenney, "RCU and CONFIG_PREEMPT_RT progress," Linux Kernel Mailing List, May 9, 2005, 2 pages.

O. Nesterov, QRCU: 'Quick' SRCU Implementation, Linux Kernel Mailing List, Dec. 1, 2005, 3 pages.

T. Gleixner, "High Resolution Timers/Dynamic Ticks-V2", LWN. net, Oct. 1, 2006, 6 pages.

P. Mckenney, "Sleepable RCU", LWN.net, Oct. 9, 2006, 10 pages.

O. Nesterov, "cpufreq_tsc() as core_initcall_sync", LKML.org, Nov. 19, 2006, 2 pages.

P. McKenney, "Using RCU in the Linux 2.5 Kernel", Kernel Korner, Oct. 1, 2003,11 pages.

A. Kleen, "How to do nothing efficiently or better laziness: No Idle tick on x86-64", 2005, 16 pages.

P. McKenney, "Read-Copy Update Implementations", 2001, 3 pages.

M. Herlihy, "A Methodology for Implementing Highly Concurrent Data Objects," ACM Transactions on Programming Languages and Systems, vol. 15, Issue 5, Nov. 1993, pp. 745-770.

M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.

N. Barghouti et al, "Concurrency Control in Advanced Database Operations," Jan. 1994, 83 pages.

P. McKenney, "Exploiting Deferred Destruction: An Analysis of Read-Copy-Update Techniques in Operating System Kernels," OGI School of School of Science & Engineering at Oregon Health & Science University, Jul. 2004, pp. 1-380.

P. McKenney et al., "Extending RCU for Realtime and Embedded Workloads," 2006 Ottawa Linux Symposium, Aug. 11, 2006, 15 pages.

P. McKenney, "The design of preemptible read-copy-update," LWN.net, Oct. 8, 2007, 27 pages.

P. McKenney, "Integrating and Validating dynticks and Preemptible RCU," LWN.net, Apr. 22, 2008, 19 pages.

P. McKenney, "Hierarchical RCU," LWN.net, Nov. 4, 2008, 19 pages.

P. McKenney et al., "Introducing Technology Into the Linux Kernel: A Case Study," Aug. 7, 2008, 14 pages.

P. McKenney, "Is Parallel Programming Hard, and, If So, What Can You Do About It," Mar. 8, 2009, 146 pages.

P. McKenney, "Re: [fwd: Re: [patch] real-time preemption, -rt-2. 6.13-rc4-v0.7.52-01]," Aug. 8, 2005, 15 pages.

P. McKenney, "Priority-Boosting RCU Read-Side Critical Sections," LWN.net, Feb. 5, 2007, 15 pages.

P. McKenney et al., "Towards hard realtime response from the Linux kernel on SMP hardware," linux.conf.au, Canberra, Australia, Apr. 2005, 16 pages.

Rossbach et al., "TxLinux: Using and Managing Hardware Transactional Memory in an Operating System," SOSP'07, Oct. 14-17, 2007, 15 pages.

Herlihy et al., "Transactional Memory: Architectural Support for Lock-Free Data Structures," 1993, 12 pages.

* cited by examiner

SAFELY ROLLING BACK TRANSACTIONS IN A TRANSACTIONAL MEMORY SYSTEM WITH CONCURRENT READERS

BACKGROUND

1. Field of the Invention

The present invention relates to computer systems and methods in which data resources are shared among concurrent data consumers while preserving data integrity and consistency relative to each consumer. More particularly, the invention concerns a concurrency implementation wherein a transactional memory system operates in conjunction with a mutual exclusion mechanism known as "read-copy update."

2. Description of the Prior Art

By way of background, transactional memory (TM) and read-copy update (RCU) both provide techniques for concurrent programming, each with various advantages and disadvantages. A single programming system may want to support both techniques. In particular, the system may want to use TM transactions to modify data while RCU readers read the same data. A combination of these two techniques could choose to present many different semantics. For some algorithms, an RCU reader can cope with uncommitted data (data that a transaction has written but not yet committed). However, previous work on combining transactions and RCU readers has required that an RCU reader may only see uncommitted data once the transaction has reached a point where it must commit, and cannot fail and roll back. Otherwise, rolling back a transaction may free memory allocated during the transaction, and thus cause the RCU reader to access an object that no longer exists, generating a fault or a difficult-to-detect error. The present invention allows readers to access uncommitted data that may disappear when a transaction rolls back.

SUMMARY

A technique for safely rolling back transactional memory transactions without impacting concurrent readers of uncommitted transaction data. An updater uses a transactional memory technique to perform an data update on data that is shared with a reader. The update is implemented as a transaction in which the updated data is initially uncommitted due to the transaction being subject to roll back. The reader is allowed to perform a data read on the uncommitted data during the transaction. Upon a rollback of the transaction, reclamation of memory locations used by the uncommitted data is deferred until a grace period has elapsed after which the reader can no longer be referencing the uncommitted data.

BRIEF DESCRIPTION OF THE DRAWINGS

The foregoing and other features and advantages of the invention will be apparent from the following more particular description of example embodiments, as illustrated in the accompanying Drawings, in which.

DETAILED DESCRIPTION OF EXAMPLE EMBODIMENT

Figure 1:
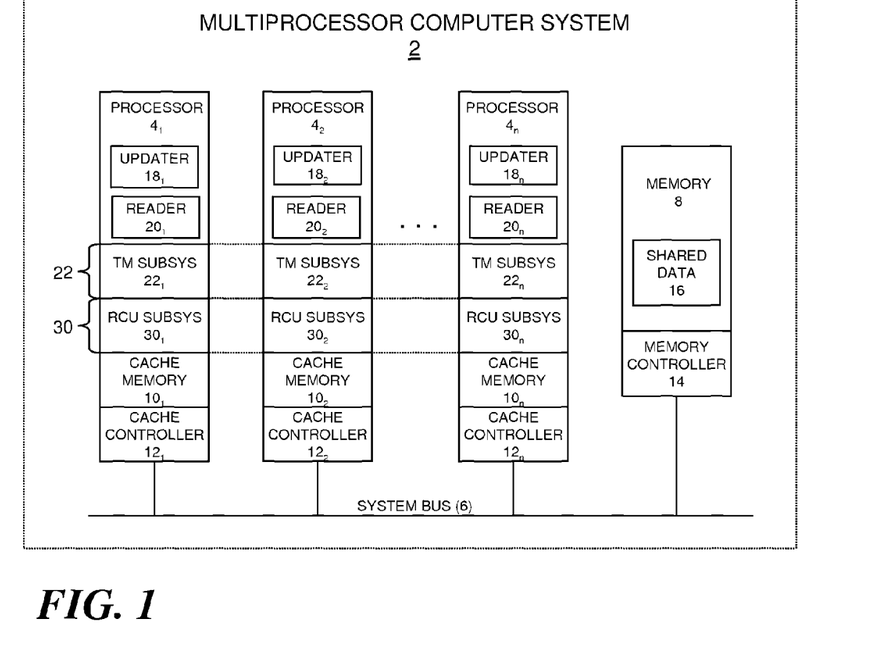
FIG. 1 is a functional block diagram showing an example computing system that implements data readers, data updaters, a TM subsystem, and an RCU subsystem.

Turning now to the figures, wherein like reference numerals are used to represent like elements in all of the several views, FIG. 1 illustrates an example computing environment in which the disclosed embodiment may be implemented. In particular, an example computing system 2 is shown in which one or more processors 4 (e.g., $4_1$, $4_2$ . . . $4_n$) are connected by way of a system bus 6 to a memory 8. As used herein, "processors" refers to single-threaded or multi-threaded CPUs (Central Processing Units) within single-core or multi-core processing devices (each core being considered a CPU) that execute program instruction logic, such as software or firmware. Such processing devices may be used in general purpose computers, special purpose computers, portable computing devices, communication and/or media player devices, set-top devices, embedded systems, to name but a few. The memory 8 may comprise any type of tangible storage medium capable of storing data in computer readable form. The processors 4 and the memory 8 may be situated within a single computing node (e.g., as part of a single-node SMP system) or they may be distributed over plural nodes (e.g., as part of a NUMA system or cluster). Conventional cache memories 10 (e.g., $10_1$, $10_2$ . . . $10_n$) and cache controllers 12 (e.g., $12_1$, $12_2$ . . . $12_n$) may be respectively associated with the processors 4. A conventional memory controller 14 may be associated with the memory 8. The memory controller 14 may be integrated with the processors 4 or could be provided separately therefrom (e.g. as part of a chipset).

It is assumed in FIG. 1 that update operations executed within user-level or operating system-level tasks (e.g., processes, threads or other execution contexts) will periodically perform updates on shared data 16 stored in the memory 8. Reference numeral 18 (e.g., $18_1$, $18_2$ . . . $18_n$) is used to represent individual update operations (updaters) that may periodically execute on the processors 4 from program instructions stored in the memory 8. The updates performed by the updaters 18 may include modifying elements of a linked list, inserting new elements into the list, deleting elements from the list, and many other types of operations (involving lists or other data structures). The processor 4 also periodically executes user-level or operating system-level read operations (readers) 20 (e.g., $20_1$, $20_2$ . . . $20_n$) from program instructions stored in the memory 8. The readers are assumed to reference the shared data 16 for reading without using locks or other mutual exclusion techniques.

The updaters 18 are assumed to periodically perform updates to the shared data 16 using a Transactional Memory (TM) subsystem 22 that operates in the computing system 2.

The TM subsystem 22 implements updates to the shared data 16 as serialized transactions that tend to be atomic, consistent, isolated, and to some extent durable. Each transaction either completes successfully without conflict with other transactions, in which case the transaction is committed, or it does not complete, in which case the transaction is aborted and rolled back. Roll back is performing by reverting the transaction state changes and reclaiming the memory locations used to hold uncommitted data written during the transaction. Except as modified in accordance with the present disclosure, the TM subsystem 22 may be implemented in any suitable manner using known transactional memory techniques that may be hardware-based, software-based, or some combination of both.

Figure 2:
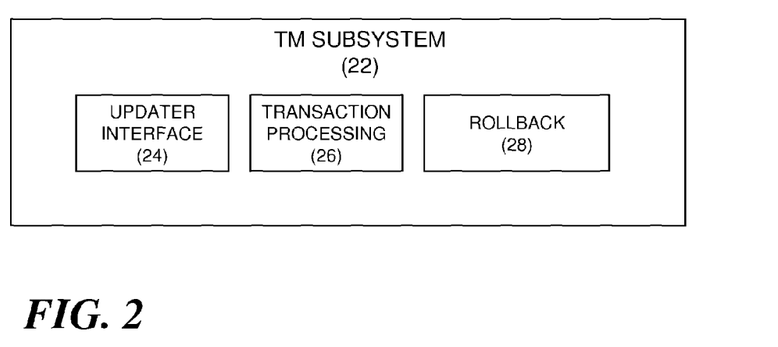
FIG. 2 is a functional block diagram showing example components of the TM subsystem of FIG. 1.

Turning now to FIG. 2, the TM subsystem 22 may include several functional components, including but not limited to an updater interface component 24, a transaction processing component 26, and a rollback component 28. The updater interface component 24 may be used by the updaters 18 (and other code) to interact with the TM subsystem 22. For example, the updater interface component 24 may provide primitives that can be used to delimit transaction start and stop points, restart transactions, interrupt and restore transactions, etc.

The transaction processing component 26 may be used to implement the load and store instructions that operate on a transaction's read and write sets. As persons skilled in the art will appreciate, a transaction's read set and write set respectively represent the shared memory values that have been read and written during a transaction. The transaction processing component 26 may also be used to manage transaction state as a transaction proceeds to the point where it either commits or fails. A transaction will typically commit only if no other transaction has updated any location in the transaction's read or write set, and no other transaction has read any location in the transaction's write set. To make this determination, the transaction processing component 26 implements a suitable form of conflict detection. When a transaction commits, the transaction's changes to its write set become finalized. If the commit fails, the transaction aborts. A transaction abort causes all changes to the transaction's write set (i.e., the uncommitted transaction data) to be discarded. This is known as a roll back.

The rollback component 28 manages transaction rollback and the reclamation of memory associated with uncommitted transaction data following a transaction abort. In the prior art, the reclamation of memory occurs without regard to other tasks. However, as will be described in more detail below, the present disclosure presents an alternative technique wherein the rollback component 28 implements reclamation in a manner that allows the readers 20 to access uncommitted data concurrently during transaction processing.

The readers 20 may be implemented as tasks that access the shared data 16 using a Read-Copy Update (RCU) subsystem 30. The RCU subsystem 30 comprises RCU subsystem instances $30_1$, $30_2$ . . . $30_n$ that periodically execute on the processors 4 from program instructions stored in the memory 8. RCU is a synchronization technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The read-copy update technique implements data updates in two phases. In the first (initial update) phase, the actual data update is carried out in a manner that temporarily preserves two views of the data being updated. One view is the old (pre-update) data state that is maintained for the benefit of operations that may be currently referencing the data. The other view is the new (post-update) data state that is available for the benefit of operations that access the data following the update. In the second (deferred update) phase, the old data state is removed following a "grace period" that is long enough to ensure that all executing operations will no longer maintain references to the pre-update data. In the context of the read-copy update mechanism, a grace period represents the point at which all running tasks (e.g., processes, threads, or other execution contexts) having access to an RCU-protected data element have passed through a "quiescent state" after which they can no longer maintain references to the data element, assert locks thereon, or make any assumptions about data element state. By convention, for operating system kernel code paths, a context switch, an idle loop, and user mode execution all represent quiescent states for any given CPU (as can other operations that will not be listed here). The second-phase update operation typically comprises freeing a stale data element from memory.

Figure 3:
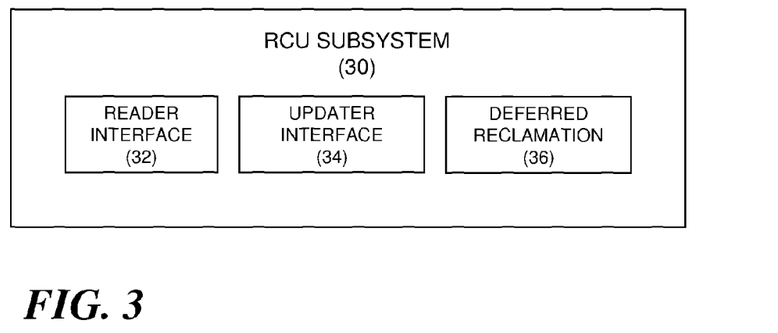
FIG. 3 is a functional block diagram showing example components of the RCU subsystem of FIG. 1.

Turning now to FIG. 3, the RCU subsystem 30 may include a reader interface component 32, an updater interface component 34, and a deferred reclamation component 36. The reader interface component 32 may be implemented using primitives such as rcu_read_lock( ) and rcu_read_unlock( ). These primitives may be invoked by the readers 20 when they respectively enter and leave an RCU-protected critical section. Such primitives provide a way for the readers 20 to advise the RCU subsystem 30 that they are engaged in RCU-protected critical section processing. The RCU subsystem 30 can use this information to track reader quiescent states as part of grace period detection. In particular, any reader 20 that is not executing critical section code nested by rcu_read_lock( ) and rcu_read_unlock( ) may be deemed to be quiescent. Alternatively, RCU may be implemented without use of such primitives, in which case reader quiescent states may be detected in other ways, such as by forcing a quiescent state using inter-processor interrupts to initiate task rescheduling.

The updater interface component 34 may be implemented using a primitive such as call_rcu( ). This primitive may be invoked by an updater 18 when it has performed an update on the shared data 16 in order to register a callback for deferred destruction of a stale pre-update version of the data. Another RCU primitive known as synchronize_rcu( ) allows an updater 18 to request a grace period, then block until the grace period has elapsed, and then remove the stale data itself.

The deferred reclamation component 36 may be implemented using any of the known RCU techniques for tracking grace periods and performing deferred reclamation of stale data elements. For example, the deferred reclamation component 36 could batch generations of callbacks on callback lists. As each grace period elapses, a new batch of callbacks that are ripe for processing can be executed, thereby reclaiming the memory locations that hold the data associated with the callbacks.

Returning now to FIG. 2, transactional memory is typically implemented in such a way that a transaction's write set does not become visible to other tasks until the transaction must commit. However, as described in the Background section above, there may be implementations where is it desirable to allow readers to reference uncommitted data (without necessarily forcing a roll back due to a reader accessing the transaction's write set). This need could arise in an environment such as the computing system 2 that supports both the TM and RCU data synchronization techniques. The same need could also arise with respect to readers that reference shared data without the use RCU.

The TM subsystem 22 is therefore designed to support concurrent reader access to uncommitted transactional memory data. In particular, the rollback component 28 is designed to have the capability of implementing deferred reclamation of uncommitted data following a transaction abort. When a transaction rolls back, instead of immediately reclaiming the memory allocated to the uncommitted transaction data, the rollback component 28 may use an RCU (or other) deferred reclamation mechanism to defer freeing this memory until a grace period has elapsed due to all affected readers having passed through a quiescent state. This ensures that no reader can pick up a pointer to an uncommitted transaction data object that disappears before the reader completes. The transaction processing component 26 may also be modified to allow reader access to transaction write set data without triggering a roll back. However, there may be implementations where this modification is not desired, such that readers accessing uncommitted data will in fact cause a transaction to a roll back.

Figure 4:
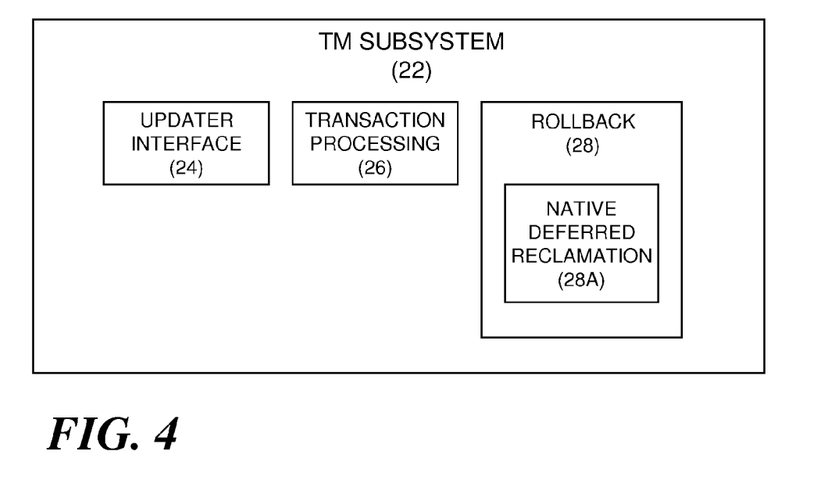
FIG. 4 is a functional block diagram showing example components of a rollback component in the TM subsystem of FIG. 1 according to one embodiment.
Figure 5:
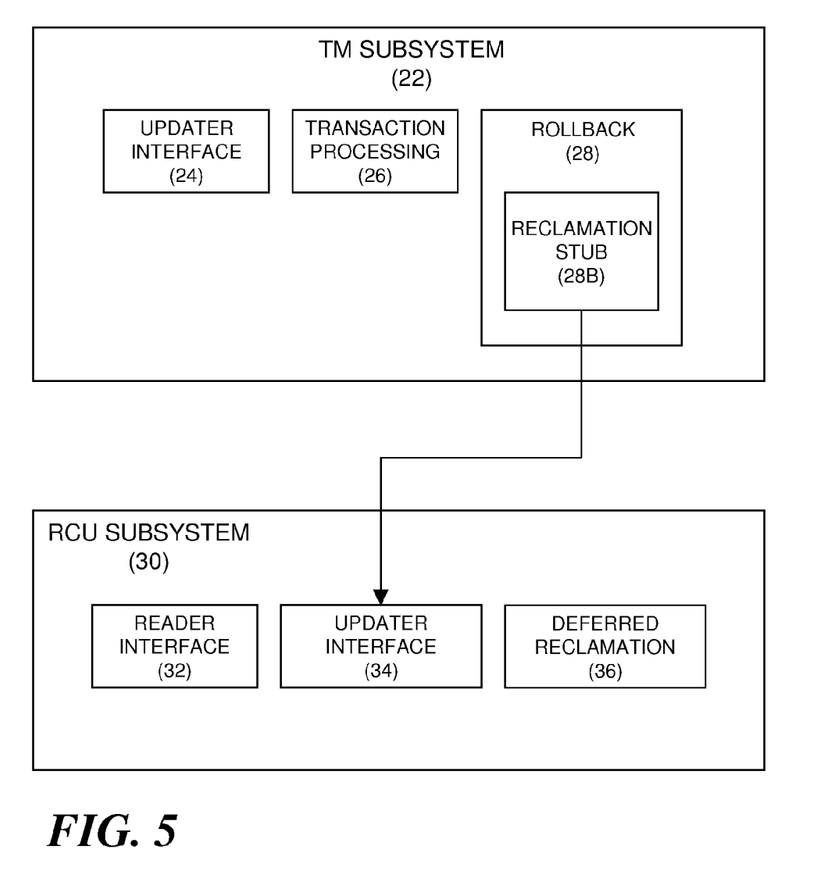
FIG. 5 is a functional block diagram showing example components of a rollback component in the TM subsystem of FIG. 1 according to another embodiment.

The foregoing functionality may be implemented according to different embodiments. FIG. 4 illustrates a first example embodiment wherein the rollback component 28 incorporates a native deferred reclamation component 28A (which may also be referred to as an internal deferred reclamation mechanism). The native reclamation component 28A could be implemented using any of the existing RCU deferred reclamation techniques (or other present or future reclamation techniques) in order to detect the end of grace period signifying all of the readers 20 have passed through a quiescent state and can no longer be referencing uncommitted transaction data. FIG. 5 illustrates a second example wherein the rollback component 28 includes a reclamation stub component 28B that is programmed to utilize the deferred reclamation component 36 of the RCU subsystem 30 (which may also be referred to as an external deferred reclamation mechanism). In this embodiment, the TM subsystem 22 could act like a regular RCU updater that registers callbacks to be processed following the end of a grace period via the updater interface 34. The reclamation component 36 of the RCU subsystem 30 would then track reader quiescent states in the usual manner to detect the end of a grace period.

Figure 6:
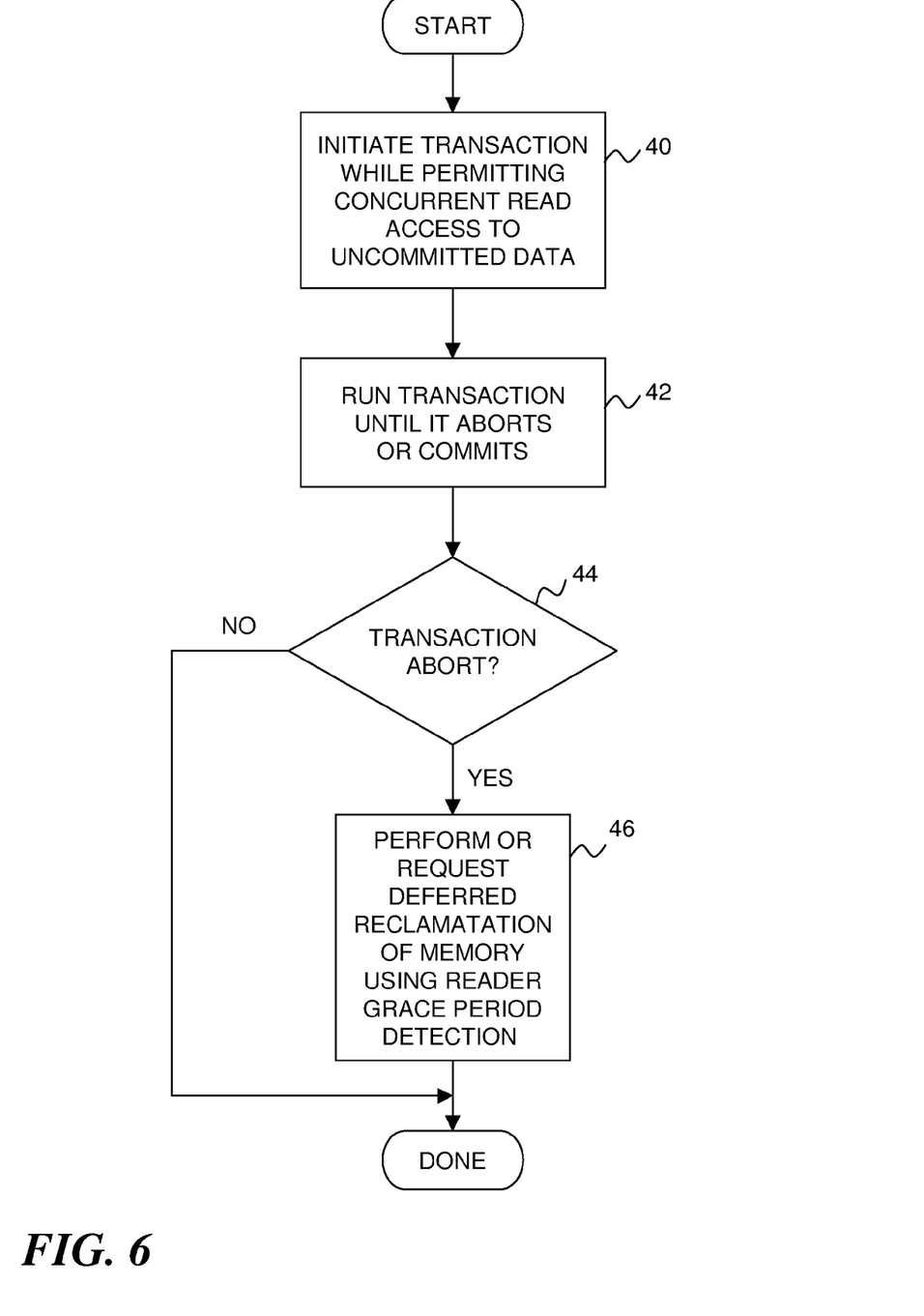
FIG. 6 is a flow diagram showing example operations of the TM subsystem of FIG. 1.
Figure 6A:
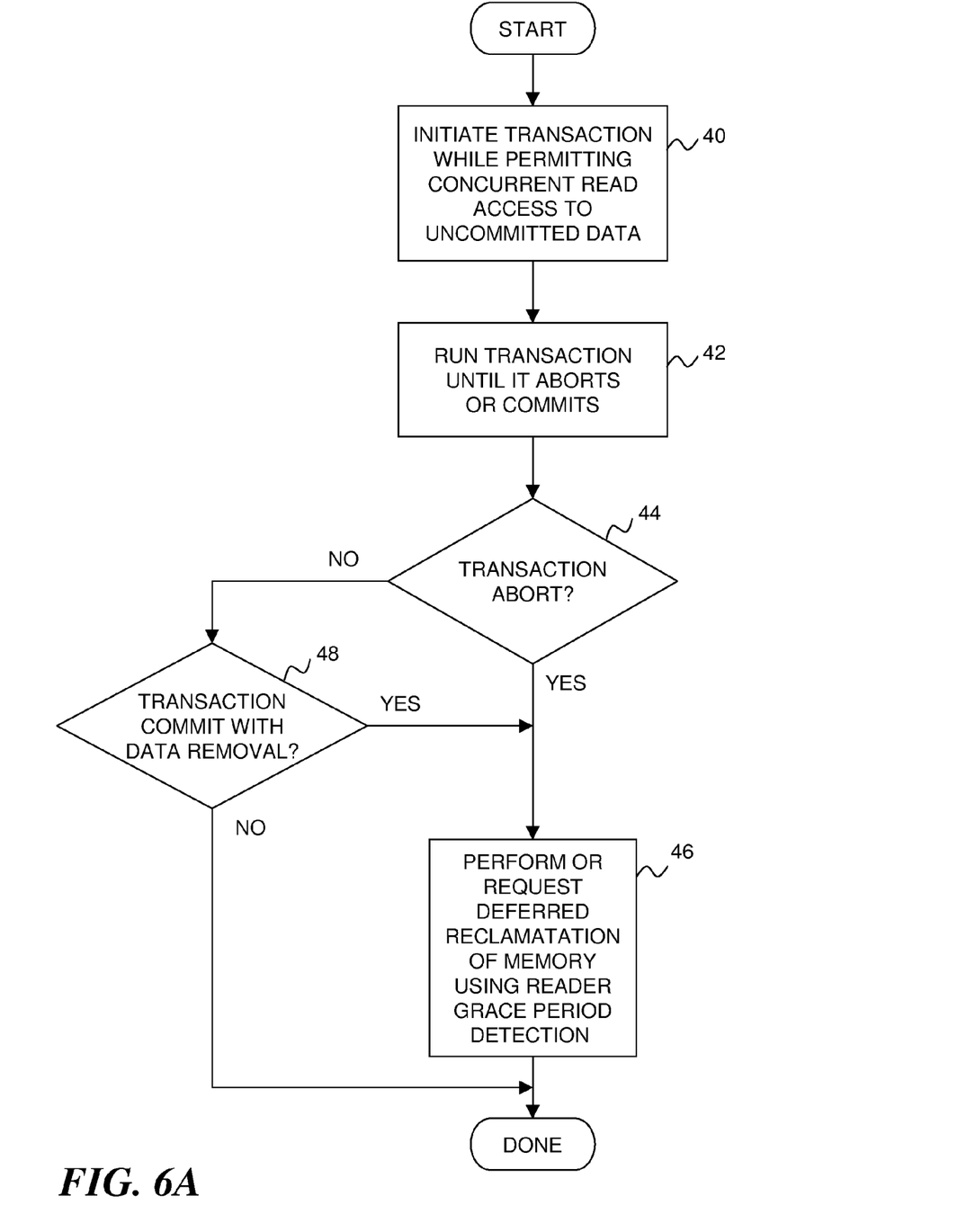
FIG. 6A is a flow diagram showing a modification of the flow diagram of FIG. 6.

Turning now to FIG. 6, example operations of the TM subsystem 22 are shown for supporting concurrent reader access to uncommitted transaction data according to the foregoing embodiments. In block 40, the transaction processing component 26 initiates a transactional memory transaction while permitting the readers 20 to concurrently read uncommitted transaction data prior to commit. In block 42, the transaction is run until it either aborts or commits. In block 44, if the transaction aborted, processing proceeds to block 46. In block 46, the rollback component 28 either performs deferred reclamation of the memory locations associated with uncommitted transaction data using the native deferred reclamation component 28A, or using the reclamation stub 28B to request such processing. If it is determined in block 44 that the transaction did not abort, block 46 is bypassed. However, it should be pointed out that there may be implementations where it is desired to perform deferred memory reclamation following a commit, such as to reclaim memory that a transaction removed from a data structure. FIG. 6A, which is identical to FIG. 6 except for the addition of new block 48, illustrates this alternative. Block 48 serves to invoke block 46 to perform deferred memory reclamation if it is determined that there was a transaction commit that resulted in data removal. In this way, readers that may have been concurrently referencing the data structure can be protected from premature reclamation of the removed data until a grace period has elapsed.

Accordingly, a technique has been disclosed for safely rolling back transactional memory transactions with concurrent readers accessing uncommitted data. It will be appreciated that the foregoing concepts may be variously embodied in any of a data processing system, a machine implemented method, and a computer program product in which digitally encoded program instructions are stored on one or more computer-readable data storage media for use in controlling a computer or other data processing machine to perform the required functions. The program instructions may be comprise machine language code that is ready for loading and execution by the machine apparatus, or the program instructions may comprise a higher level language that can be assembled, compiled or interpreted into machine language. Example high level languages include, but are not limited to assembly, C, C++, to name but a few. When implemented on a machine comprising a CPU, the program instructions combine with the CPU to provide a particular machine that operates analogously to specific logic circuits, which themselves could be used for the invention.

Figure 7:
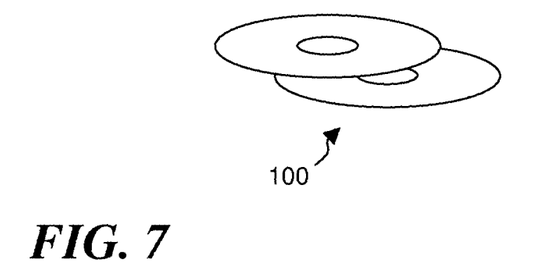
FIG. 7 is a diagrammatic illustration of example media that may be used to provide a computer program product for implementing TM modifications and RCU readers in accordance with the present disclosure.

Example data storage media for storing such program instructions are shown by reference numeral 100 in FIG. 7. The media 100 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the program instructions of the invention either alone or in conjunction with an operating system or other software product that incorporates the required functionality. The media could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of media, when the program instructions are loaded into and executed by an instruction execution system, apparatus or device, the resultant programmed system, apparatus or device becomes a particular machine for practicing embodiments of the method(s) and system(s) described herein.

Although various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. In a data processing system having at least one CPU, a memory operatively coupled to said CPU, said memory including a storage medium tangibly embodying data that is subject to concurrent access by a data updater that updates said data and a data reader that reads said data, a method for safely rolling back transactions implemented by said updater to update said data using a transactional memory technique as said reader reads said updated data while said transactions are uncommitted and subject to roll back, comprising:

said updater executing on said at least one CPU to perform a data update on said data to produce updated data using a transactional memory technique wherein said data update is implemented as a transaction in which said updated data is initially uncommitted data due to said transaction being subject to roll back in the event of said transaction aborting, said uncommitted data comprising a transaction write set representing shared memory locations that are written to during said transaction;

said reader executing on said at least one CPU to perform a data read on said uncommitted data after said transaction has started and prior to said transaction either committing or aborting; and upon an abort of said transaction, deferring reclamation of said memory locations used by said uncommitted data until a grace period has elapsed after which said reader can no longer be referencing said uncommitted data.

2. The method of claim 1, further including:

upon a commit of said transaction, deferring reclamation of memory locations used by data that has been removed by said transaction until a grace period has elapsed after which said reader can no longer be referencing said removed data.

3. The method of claim 1, wherein said deferred reclamation of said uncommitted data is performed using a transactional memory subsystem that performs said rollback using an internal deferred reclamation mechanism that is part of said transactional memory subsystem.

4. The method of claim 3, wherein said deferred reclamation of said uncommitted data is performed using a read-copy update deferred reclamation technique.

5. The method of claim 1, wherein said deferred reclamation of said uncommitted data is performed using a transactional memory subsystem that calls an external deferred reclamation mechanism that is part of a read-copy update subsystem.

6. The method of claim 1, wherein said reader is a read-copy update reader that uses read-copy update primitives to read said uncommitted data.

7. A system, comprising:

a CPU;

a memory operatively coupled to said CPU, said memory including a storage medium tangibly embodying data that is subject to concurrent access by a data updater that updates said data and a data reader that reads said data;

said memory further tangibly embodying a program of instructions executable by said CPU to perform operations for safely rolling back transactions implemented by said updater to update said data using a transactional memory technique as said reader reads said updated data while said transactions are uncommitted and subject to roll back, comprising:

said updater executing on said at least one CPU to perform a data update on said data to produce updated data using a transactional memory technique wherein said data update is implemented as a transaction in which said updated data is initially uncommitted data due to said transaction being subject to roll back in the event of said transaction aborting, said uncommitted data comprising a transaction write set representing shared memory locations that are written to during said transaction;

said reader executing on said at least one CPU to perform a data read on said uncommitted data after said transaction has started and prior to said transaction either committing or aborting; and upon an abort of said transaction, deferring reclamation of memory locations used by said uncommitted data until a grace period has elapsed after which said reader can no longer be referencing said uncommitted data.

8. The system of claim 7, wherein said operations further include:

upon a commit of said transaction, deferring reclamation of memory locations used by data that has been removed by said transaction until a grace period has elapsed after which said reader can no longer be referencing said removed data.

9. The system of claim 7, wherein said deferred reclamation of said uncommitted data is performed using a transactional memory subsystem that performs said rollback using an internal deferred reclamation mechanism that is part of said transactional memory subsystem.

10. The system of claim 9, wherein said deferred reclamation of said uncommitted data is performed using a read-copy update deferred reclamation technique.

11. The method of claim 7, wherein said deferred reclamation of said uncommitted data is performed using a transactional memory subsystem that calls an external deferred reclamation mechanism that is part of a read-copy update subsystem.

12. The system of claim 7, wherein said reader is a read-copy update reader that uses read-copy update primitives to read said uncommitted data.

13. A computer program product, comprising:

one or more non-transitory computer-readable storage media:

program instructions stored on said one or more storage media for programming a CPU that is operatively coupled to a memory, said memory including a storage medium tangibly embodying data that is subject to concurrent access by a data updater that updates said data and a data reader that reads said data, said program instructions programming said CPU to perform operations, comprising:

said updater executing on said at least one CPU to perform a data update on said data to produce updated data using a transactional memory technique wherein said data update is implemented as a transaction in which said updated data is initially uncommitted data due to said transaction being subject to roll back in the event of said transaction aborting, said uncommitted data comprising a transaction write set representing shared memory locations that are written to during said transaction;

said reader executing on said at least one CPU to perform a data read on said uncommitted data after said transaction has started and prior to said transaction either committing or aborting; and upon an abort of said transaction, deferring reclamation of memory locations used by said uncommitted data until a grace period has elapsed after which said reader can no longer be referencing said uncommitted data.

14. The computer program product of claim 13, wherein said operations further include:

upon a commit of said transaction, deferring reclamation of memory locations used by data that has been removed by said transaction until a grace period has elapsed after which said reader can no longer be referencing said removed data.

15. The computer program product of claim 13, wherein said deferred reclamation of said uncommitted data is performed using a transactional memory subsystem that performs said rollback using an internal deferred reclamation mechanism that is part of said transactional memory subsystem.

16. The computer program product of claim 15, wherein said deferred reclamation of said uncommitted data is performed using a read-copy update deferred reclamation technique.

17. The computer program product of claim 13, wherein said deferred reclamation of said uncommitted data is performed using a transactional memory subsystem that calls an external deferred reclamation mechanism that is part of a read-copy update subsystem.

18. The computer program product of claim 13, wherein said reader is a read-copy update reader that uses read-copy update primitives to read said uncommitted data.

19. In a data processing system having at least one CPU, a memory operatively coupled to said CPU that includes a storage medium tangibly embodying data that is subject to concurrent access by a data updater that updates said data and a data reader that reads said data, a method for safely rolling back transactions implemented by said updater to update said data using a transactional memory technique as said reader reads said updated data while said transactions are uncommitted and subject to roll back, comprising:

said updater executing on said at least one CPU to perform a data update on said data to produce updated data using a transactional memory technique wherein said data update is implemented as a transaction in which said updated data is initially uncommitted data due to said transaction being subject to roll back in the event of said transaction aborting, said uncommitted data comprising a transaction write set representing shared memory locations that are written to during said transaction;

said transactional memory technique being one of a hardware transactional memory technique or a software transactional memory technique;

said reader executing on said at least one CPU to perform a data read on said uncommitted data after said transaction has started and prior to said transaction either committing or aborting;

said reader being a read-copy update reader that uses read-copy update primitives to read said uncommitted data; and upon an abort of said transaction, deferring reclamation of memory locations used by said uncommitted data until a grace period has elapsed after which said reader can no longer be referencing said uncommitted data; and said deferred reclamation of memory locations used by said uncommitted data being performed using a read-copy update deferred reclamation technique.

20. The method of claim 19 wherein said deferred reclamation of said uncommitted data is performed using a transactional memory subsystem that either (1) performs said rollback using an internal read-copy update deferred reclamation mechanism that is part of said transactional memory subsystem, or (2) calls an external read-copy update deferred reclamation mechanism that is part of a read-copy update subsystem.

* * * * *